Aug. 1, 1967  H. T. MENEELY  3,333,342
PARALLEL RULER
Filed Sept. 7, 1965  2 Sheets-Sheet 1
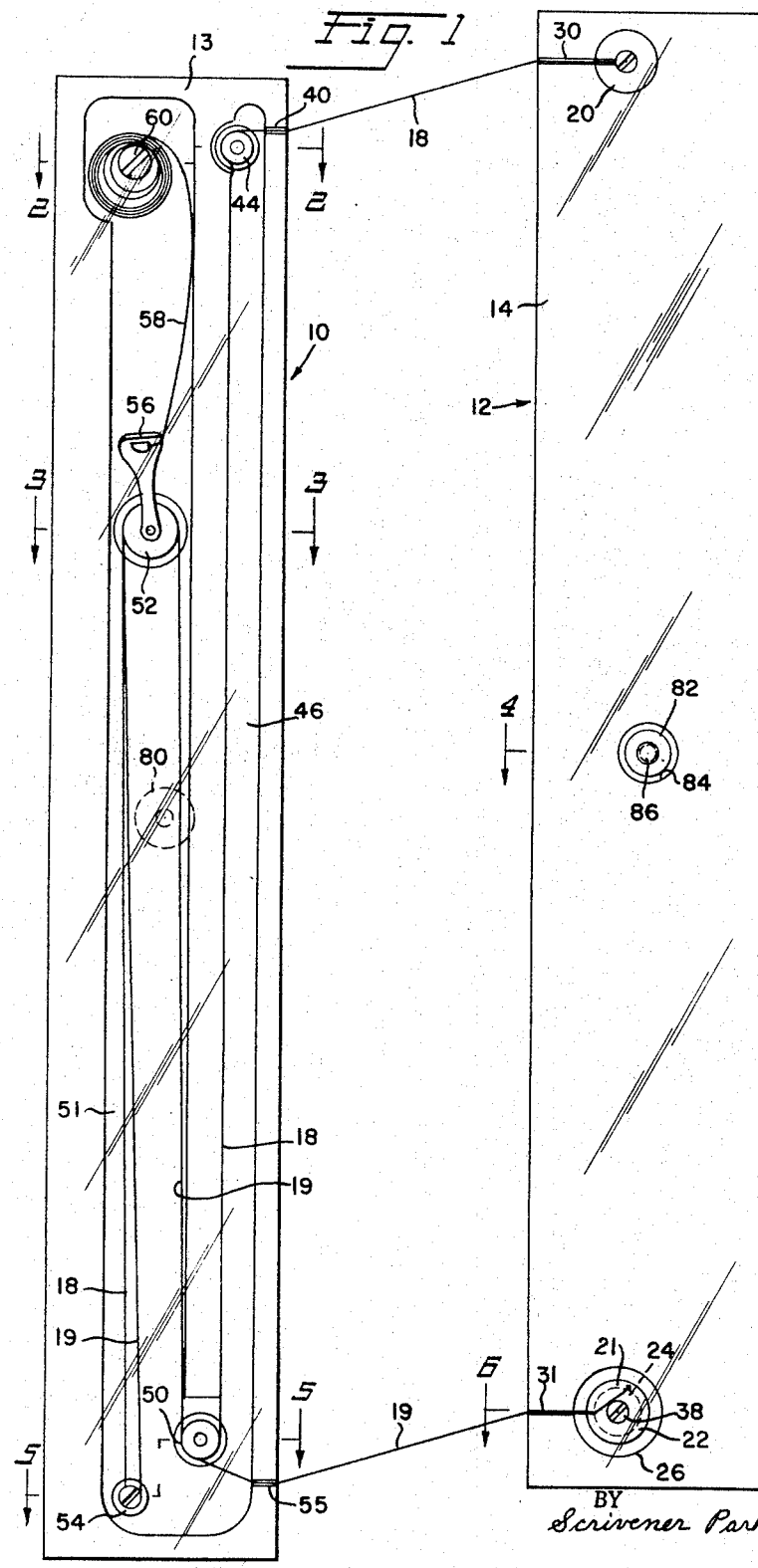
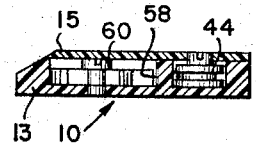
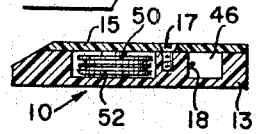
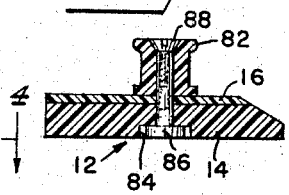
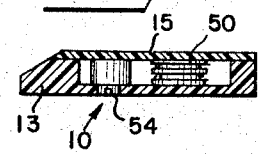
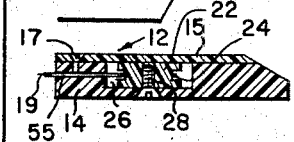
INVENTOR
HENRY T. MENEELY
BY
Scrivener Parker Scrivener & Clarke
ATTORNEYS INVENTOR
HENRY T. MENEELY
BY
Scrivener Parker Scrivener + Clarke
ATTORNEYS

United States Patent Office 3,333,342
Patented Aug. 1, 1967

3,333,342
PARALLEL RULER
Henry T. Meneely, 19½ Revell St.,
Annapolis, Md. 21401
Filed Sept. 7, 1965, Ser. No. 485,498
6 Claims. (Cl. 33—108)

This invention relates to parallel rules and more particularly to parallel rules which are especially, though not exclusively, adapted for use in navigation and similar operations.

Those skilled in the art will recognize that parallel rulers of the general type with which the present invention is concerned have many uses other than for navigation but for purposes of illustration, the ruler of the invention will hereinafter be described primarily as used for purposes of navigation. In navigation, particularly piloting, it is often necessary that the position of a vessel be determined by plotting on a chart lines of bearing from the vessel to two or more angularly spaced objects shown on the chart, the intersection of these lines on the chart being an accurate determination of the position of the vessel at a given moment. The lines of bearing are derived visually, usually by sighting at a distant but charted object over a compass card and each bearing line is plotted on the chart by first aligning one side of a parallel ruler with a compass rose printed on the chart and in an angular position corresponding to the sighted bearing and then moving the ruler from the rose in the same angular orientation until the opposite side of the ruler is in alignment with the object as it is shown on the chart. The navigator then strikes a pencil line along the aligned edge of the parallel ruler and repeats the operation for each of the other lines of bearing, it being understood that in each instance the proper visual bearing must be established on the compass rose before the parallel ruler is moved into alignment with the charted object. So long as the lines of bearing have been accurately sighted and also so long as the sighted bearings have been transferred from the compass rose to the charted object without accidental cocking or slipping of the ruler, the drawn lines of bearing should intersect at a common point to give a very accurate indication of the position of the vessel.

On very large vessels alignment of the parallel ruler with the printed compass rose is usually obviated by the provision of conventional drafting machines wherein the line of bearing is established merely by swiveling a straight edge about a movable center scribed in degrees of arc. On smaller vessels, which simply do not have the space to accommodate drafting machines, two types of parallel rulers are commonly employed. One of these is referred to as a roller type ruler wherein the ruler is supported on longitudinally spaced frictional rollers whereby the ruler may be rolled from or to a compass rose. With this type of ruler, extraordinary care must be used to prevent it from slipping from its selected angularity and if the ruler does slip this is not readily detected because once it has been rolled away from a reference point such as a compass rose, there is no longer any reference for determining whether or not the ruler is still properly angularly oriented.

The second type of ruler and the one most frequently employed for navigation purposes particularly on smaller vessels, is composed of two longitudinal parts which are swingably connected together at their opposite ends by a pair of links of identical length whereby the ruler may be "walked" across a chart. With this type of ruler, the respective parts are alternately held stationary with one hand while the other swings the other part to the full extent of the links this being repeated until the edge of one part of the ruler is aligned with the compass rose or with a charted object to determine a course or to establish a line of bearing.

Though the walking type of parallel ruler has been used in navigation for a long period of time, it has always been subject to drawbacks, one of which is slipping, particularly where a printed compass rose is located remotely on the chart from an object which is to be used as a reference. Furthermore, the size of the "steps" with this type of ruler is limited by the length of the links. Thus considerable time must often be spent in traversing the chart between a compass rose and the reference and if a vessel is traveling at high speed it can move into danger before its position can be determined. Furthermore, because this type of ruler can move only in a fixed geometric pattern it is seldom that it can be walked directly from the rose to the object or vice versa, and backing and filling is usually required to establish a path of travel which will insure that the charted member will be properly reached by the ruler. This extra movement is not only time consuming but also increases the possibility of slippage with consequent mislocation of the vessel on the chart.

It is the broad object of the present invention to provide a parallel ruler which overcomes substantially all of the difficulties and disadvantages of prior parallel rulers.

Another object of the invention is to provide a two-part parallel ruler having none of the described limitations of the two-part linked rulers of the walking variety.

More particularly it is an object of the invention to provide a two-part parallel ruler wherein one part is connected to the second part by a pair of flexible elements adjacent to the opposed ends of the parts, tensioning means being provided which bias the flexible elements to retracted position whereby the adjacent sides of the rule parts are normally retained in abutting relationship with each other, the flexible elements being readily extended to permit movement of one part of the ruler away from the other part while also permitting swinging of the parts with respect to each other with the parts maintaining strict parallel relationship with each other regardless of the degree of relative movement.

Other objects and their attendant advantages will become apparent as the following detailed description is read in conjunction with the accompanying drawing wherein:

FIG. 1 is a bottom plan view of a parallel ruler constructed in accordance with the present invention;

FIG. 2 is a vertical cross-sectional view taken substantially on the line 2—2 of FIG. 1;

FIG. 3 is a vertical cross-sectional view taken substantially on the line 3—3 of FIG. 1;

FIG. 4 is a vertical cross-sectional view taken substantially on the line 4—4 of FIG. 1;

FIG. 5 is a vertical cross-sectional view taken substantially on the line 5—5 of FIG. 1;

FIG. 6 is a vertical cross-sectional view taken substantially on the line 6—6 of FIG. 1.

Figure 7:
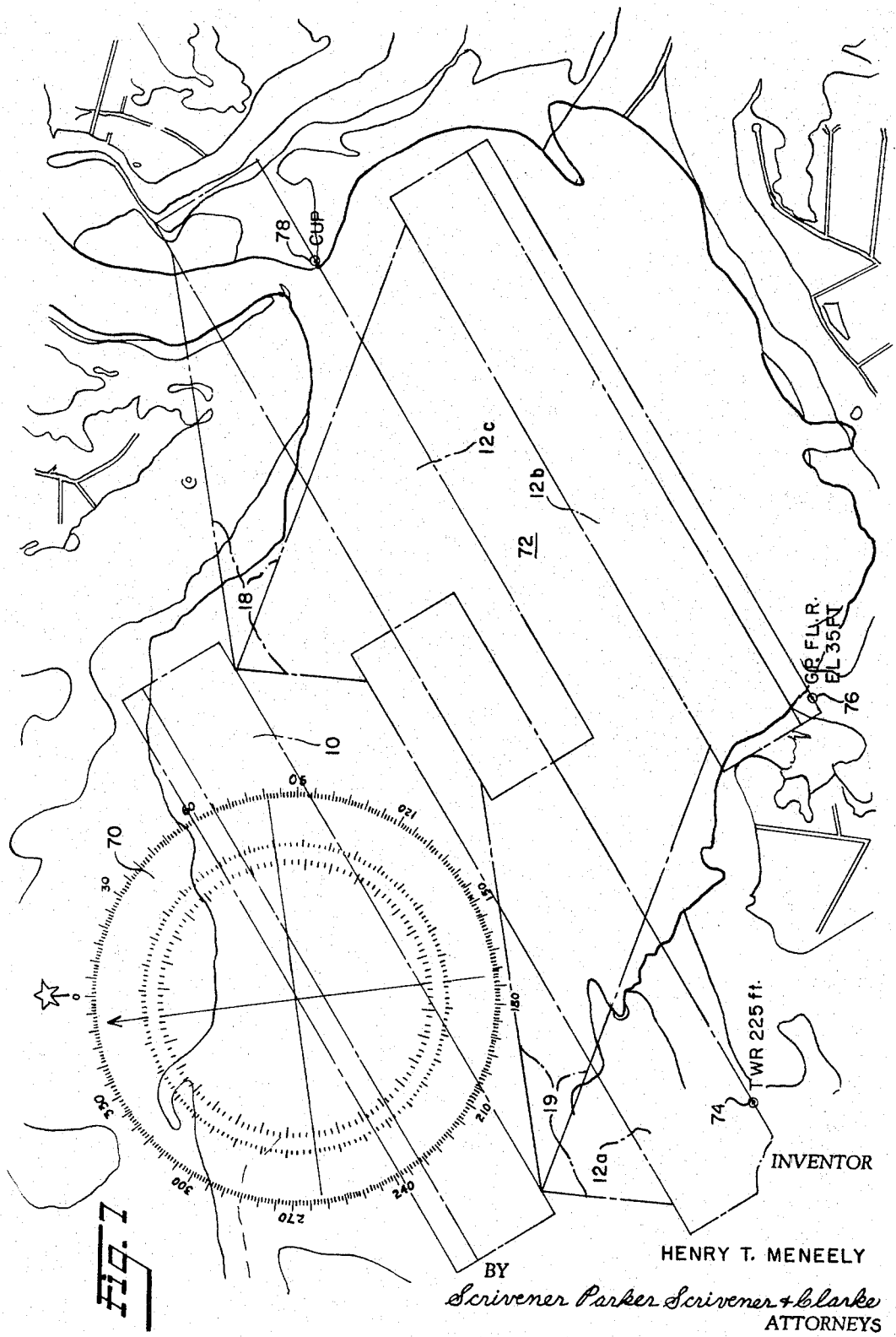
FIG. 7 is a vertical plan view of a portion of a chart showing one manner of use of the ruler of the present invention.

Referring now to the drawings and particularly to FIG. 1, it will be observed that the ruler of the invention comprises two narrow, rectangular body members 10, 12 of plastic or like material which may be composed, respectively, of base members 13, 14 surmounted by relatively thin cover members 15, 16 which may be attached to the base members in any convenient fashion as by small screws 17. The opposite ends of the parts 10, 12 are connected together by flexible elements 18, 19 with one end of each element being fastened to respective anchoring means 20, 21 in the member 12.

Either or both of the anchoring means may comprise a capstan wheel 22, as illustrated in FIG. 6, to which the end of one element, say element 19, is connected, as by being threaded through a drilled passage in the wheel 22 with the outermost end of the element 19, where it emerges from the passage, being knotted so that when the wheel is rotated the element is wound into or out of a groove 24 about the periphery of the wheel. As illustrated in FIG. 6, the base member 14 of the part 12 of the rule may be partly bored to provide a cavity 26 for receiving the capstan 22 with the latter having sufficient thickness whereby it is frictionally clamped between the upper and lower walls of the cavity, a screw 28 extending through the lower wall into engagement with the capstan whereby the latter may be turned by means of a small screw driver.

The flexible elements 18, 19 lead out through respective lateral guide passages 30, 31 drilled through the inner side edge of the base member 14 of the part 12 and with reference to element 18, it will be seen in FIG. 1 that this extends from its lateral passage 30 in the member 12 into a second lateral guide passage 40 through the base 13 of the second member 10 of the ruler. From the passage 40, the element 18 is led around a rotatable grooved pulley 44 in the member 10 and along a passage 46 having at its opposite end a fixedly pivoted, double grooved pulley 50 (see FIG. 5) around one groove of which the element 18 passes into an enlarged passage 51 having at its end opposite the pulley 50 a double grooved movable pulley 52 (see FIG. 3) about one groove of which the element 18 passes to terminate at a fixed anchor 54 at the end of the passage 51 remote from the pulley 52.

Referring now to the flexible element 19, it will be seen in FIG. 1 that this leads into the member 10 through a lateral guide passage 55 which has the same spacing from the guide passage 40 as the spacing between the passages 30, 31 on the member 12. From the passage 55 the element 19 passes around the second groove in the fixed pulley 50, thence around the second groove in the movable pulley 52 and from there to the same anchor point 54 to which the end of the element 18 is connected.

As can be clearly seen in FIG. 1, the movable pulley 52 is connected by means of a suitable bracket 56 to one end of a spring 58 whose opposite end is anchored to a screw 60 at the end of the enlarged passage 51 opposite the anchor 54 for the flexible elements 18, 19. The spring 58 is biased to coiled or retracted position so that when the members 10, 12 are moved with respect to each other, the spring 58 through the pulley 52 maintains tension in the flexible elements 18, 19, and when the members 10, 12 are moved towards each other, the spring 58 retracts to move the pulley 56 toward the spring anchor 66 to automatically take up the flexible elements.

Prior to using the ruler of the invention, it may be necessary to make a minor adjustment in order to insure that the flexible elements 18, 19 have substantially the same length between the inner edges of the body members and have substantially the same degree of tension therein. This is readily determined by moving the parts 10, 12 into abutting engagement with each other and then attempting to cock slightly one of the members with respect to the other. Should one end of one member move slightly and loosely away from the corresponding end of the other, it indicates that the flexible element at that end is too long and is not being properly tensioned by the spring 58. This is very simply taken care of by turning the appropriate capstan 22 until the two parts 10, 12 are moved into abutment with each other with substantially uniform force throughout their length. It has been found in actual practice that the adjustment can be quickly and accurately made without the exercise of any particular skill and in fact only a single capstan need be supplied for one of the elements with the other element being permanently anchored. With a single capstan, it is necessary that there be a slight excess of flexible element initially on the capstan, adjustment being effected by either backing off or taking up on the capstan until the tension on both of the flexible elements is substantially identical. Because the capstan is frictionally clamped between the walls of its cavity as previously mentioned, it is frictionally retained in any adjusted position.

For purposes of illustrating one use of the invention, there is shown in FIG. 7 a portion of a nautical chart including a compass rose 70, a body of water 72, typical shore line and the three charted landmarks which may be a tower 74, a lighthouse 76 and a cupola 78. Should the visual bearing from a vessel to the tower 74 be 240°, the navigator places either part of the ruler, say the part 10, on the compass rose 70 with the outer edge passing through the center of the rose and the 240° mark as shown. He then merely moves the other part 12 of the ruler downwardly and to the left to the first phantom line position 12a until the outer edge of the part 12 coincides with the position of the tower printed on the chart. The navigator then draws a line along the edge of the part 12 to establish a line of position for the vessel. If, instead of the tower, the same vessel or another was so positioned that the cited bearing of 240° was taken on the lighthouse 76 the navigator would merely move the part 12 outwardly and swing it as far to the right as necessary to the second phantom line position 12b until the outer edge of the member 12 touches the charted position of the lighthouse as printed on the chart. In another example, where a visual bearing is taken on the cupola 78 and found to be 60°, the navigator would again align the outer edge of the part 10 with the center of the compass rose and with the 60° mark and would then as before, move the other part 12 outwardly while swinging it upwardly as far as necessary to the third phantom line position 12c until its outer edge touches the cupola printed on the chart.

As those familiar with the art are aware, each navigational chart has printed thereon several compass roses in various positions on the chart. A distinct advantage of the present invention is that the maximum length of the flexible elements can be selected so that for any particular location of the vessel, or other object on the chart, the ruler can almost always span the distance between the object and the nearest compass rose without "walking" and with no chance of slipping. However, if walking is necessary because of unusual spacing conditions the ruler of the invention is fully capable of being walked in a manner similar to conventional rulers though it should be quite apparent that only very seldom would ever more than one step be required to go from or to an appropriate compass rose.

In order to effect movement of one part of the ruler with respect to the other part, each of the parts 10, 12 is provided respectively with an upstanding handle 80, 82 as shown in FIGS. 1 and 4 with each of the handles being centrally disposed on its part along the length thereof. With the handles centrally located, it has been found in actual practice that there is no detectable tendency of one part of the ruler to cock with respect to the other during use, but whatever tendency there may be as a result of unconscious twisting of a handle by an operator, this effect can be almost entirely eliminated by mounting one or both of the handles so that they freely swivel with respect to the parts on which they are carried. Any suitable arrangement may be utilized for accomplishing this, as for example the part 12 may be counterbored as shown at 84 in FIG. 4 and a headed internally threaded sleeve 86 may be inserted through a co-axial opening in the member 12 to receive a screw 88 whose head is spaced above the member 12 a distance slightly greater than the length of a passage through the handle 82 whereby the handle has complete freedom to swivel with respect to the member 12.

Experienced operators will recognize that the means for retaining tension on the flexible members 18, 19 is exemplary only and that any of a variety of tensioning means can be employed, as for example, a spring loaded drum to which the flexible elements are fairleaded by suitable pulleys and guides could be employed. This and a wide variety of other changes and modifications may be resorted to without departing from the scope and spirit of the invention as set forth in the appended claims.

What is claimed is:

1. A ruler of the type having a pair of flat, elongated rectangular body members, each having straight parallel inner and outer edges, both of said body members being freely angularly and longitudinally positionable with respect to selected indicia and with either of their respective edges in alignment with said indicia, a pair of longitudinally spaced passage means in each of said body members having spaced openings extending through the adjacent inner edges of the respective body members, the openings in each body member being equally spaced so that the corresponding openings of each pair are registerable with each other when the respective inner edges of said body members are in abutment with each other, a pair of inelastic, flexible elements extending through and between the corresponding openings and passages of each pair thereof, means anchoring said flexible members to one of said body members, and combined tensioning and slack take-up means carried by said second body member and operatively engaging said flexible elements, said last named means being movable in one direction for retracting said elements and movable in the opposite direction for feeding out said elements when said body members are moved away from each other, and resilient means operating at all times on said combined tensioning and slack take-up means to bias it in its first direction of movement so that the inner edges of said body members normally abut each other with a force which is uniform along the length thereof.

2. The parallel ruler of claim 1 wherein the anchoring means on the first body member includes means for adjusting the length of at least one of said flexible elements in order to equalize the tension in both of said elements.

3. The parallel ruler of claim 2 wherein said adjusting means comprises a rotatable capstan to which said flexible element is attached and which serves as an anchor for said element in addition to providing means for adjusting the length thereof upon rotation of said capstan.

4. The ruler of claim 1 including second anchoring means connecting said flexible elements to said second body member and wherein said combined tensioning and slack take-up means comprises a movable pulley engaging said elements intermediate said anchoring means and said guide means, said resilient means comprising spring means operating on said pulley means to urge it at all times towards a position wherein said flexible elements are tensioned between the first and second anchoring means on the respective first and second body members.

5. The ruler of claim 1 including upstanding handle means connected centrally to at least one of said body members.

6. The ruler of claim 5 wherein at least one of said handle means is connected to its body member by means enabling said handle to freely swivel with respect to said body member.

References Cited

UNITED STATES PATENTS

| | | | |
|---|---|---|---|
| 684,994 | 10/1901 | Lydick | 33—79 |
| 1,357,462 | 11/1920 | Lund | 33—108 |
| 1,746,537 | 2/1930 | Knechtel | 33—108 |
| 3,180,027 | 4/1965 | Ingle | 33—79 |

FOREIGN PATENTS 155,153  12/1920  Great Britain.

LEONARD FORMAN, *Primary Examiner.*

H. N. HAROIAN, *Assistant Examiner.*